United States Patent Office 3,842,053
Patented Oct. 15, 1974

3,842,053
PERFLUOROALKYL IODIDE MODIFIED
POLYBUTADIENE RESINS
José L. Villa, Hightstown, and Hyman Iserson, Trenton, N.J., assignors to Thiokol Chemical Corporation, Bristol, Pa.
No Drawing. Continuation of abandoned application Ser. No. 259,650, July 5, 1973. This application Dec. 28, 1973, Ser. No. 429,478
Int. Cl. C08d 5/04
U.S. Cl. 260—83.3   19 Claims

ABSTRACT OF THE DISCLOSURE

Perfluoroalkyl iodides are reacted with homopolymers and copolymers of butadiene to produce perfluoroalkyl iodide modified butadiene resins. These resins are suitable for oil and water repellants used as coatings for textiles, wood, and metal, as well as for other purposes.

This is a continuation of application Ser. No. 259,650, filed July 5, 1973, now abandoned.

BACKGROUND OF THE INVENTION

Field of the Invention

This invention relates to the addition of perfluoroalkyl iodides to homopolymers and copolymers of butadiene to produce perfluoroalkyl iodide modified polybutadiene resins. More particularly, the present invention is concerned with butadiene homopolymers and butadiene copolymers with styrene, acrylic acid, vinyl acetate, or acrylonitrile which have hydroxyl, carboxyl or phenyl terminals.

These perfluoroalkyl iodide adducts are suitable for use as oil and water repellants for coating textiles, wood, or metal. In addition, they are useful in the formulation of films, stable fluids, furniture polishes, i.e., in any compositions advantageously using a mixed fluorocarbon and hydrocarbon.

DESCRIPTION OF THE PRIOR ART

Previous polymers containing perfluoro groups have centered upon adding the perfluoro group to the monomer and then polymerizing or copolymerizing the monomer to yield the desired product. Cf. U.S. 3,645,989 and 3,645,990. Whereas here the perfluoroalkyl iodide is added to the polymer directly.

Also, previous reactions of fluoroalkyl iodides with organic compounds have centered about the addition of polyfluoroalkyl methyl I ethyl iodides, i.e. $R_fCH_2I$ or $R_fCH_2CH_2I$, to low molecular weight aliphatic compounds to yield products wherein the iodide is on a carbon atom separated from the perfluoro group by more than one intervening carbon atom. These previous compounds are thereby activated for dehydrohalogenation under the action of mild bases. Examples of these reactions are illustrated in the articles by Henne et al., J. Am. Chem. Soc., 73, 1791 (1951); by Hazeldine, J. Chem. Soc., London, 1199 (1953); as well as in U.S. Pats. 2,972,638; 3,016,406; and 3,408,411.

Other prior work dealt with reactions of polyfluoroalkyl iodides which would not occur by ultraviolet light initiation. Cf. U.S. 3,145,222. The reactions of this invention can proceed under ultraviolet light catalysis thereby differing from the above.

SUMMARY OF THE INVENTION

Therefore, it is an object of this invention to produce perfluoroalkyl iodide modified polybutadiene polymers which contain functional terminals.

Another object is to produce perfluoroalkyl iodide modified copolymers of butadiene with styrene, acrylic acid, vinyl acetate, or acrylonitrile, which have functional terminals.

A further object is to prepare perfluoroalkyl iodide modified polymers and copolymers in which the functional terminals are hydroxyl, carboxyl, or phenyl groups.

A further object is to produce new compositions of matter and to advance the art.

These and other objects will become apparent in the following description and claims.

DESCRIPTION OF THE PREFERRED EMBODIMENTS

The perfluoroalkyl iodides which are suitable for use in this invention correspond to the general formula:

$$C_nF_{2n+1}I$$

wherein $n=2$ to 30, preferably $n=2$ to 20, and most preferably any single perfluoroalkyl iodide or any mixture thereof. These iodides may be prepared in any well known manner. Representative modes of preparation are illustrated in "Fluorocarbons and their Derivatives" by R. E. Banks, London, 1964, pp. 56–61; and in an article by Hazeldine, J. Chem. Soc., London, 1953, p. 3761 which are incorporated herein by reference. These perfluoroalkyl iodides are completely fluorinated and contain no hydrogen or other substituents along the alkyl chain as evidenced by the alternative representation $R_fI$. While individual iodides may be used, some advantages develop from the use of mixed alkyl groups, thereby making such a mixture suitable for use in this invention.

The polybutadiene polymers and copolymers which may be modified by the addition of the perfluoroalkyl iodide include those containing hydroxyl, carboxyl, or phenyl terminals, and which inherently contain pendant vinyl groups which react with the perfluoroalkyl iodides. Generally, the higher the pendant vinyl content, the more fluorine which may be attached to the polymers.

The hydroxy-terminated butadiene polymers may be prepared by ozonizing a butadiene homopolymer and then reducing the ozonized polymer with a metal hydride to form the hydroxyl-terminated polymer in accordance with the procedure of patent application U.S. Ser. No. 219,780, filed Aug. 27, 1962, now abandoned, or U.S. Pat. 3,663,-480. Alternatively, a commercially available hydroxyl-terminated butadiene liquid polymer, as for example, those designated Poly BD® R–15M, R–45M, and R–45 HT from the Atlantic Richfield Company, and those designated as Hystl® G–1000, G–2000, and G–3000 from the Hystl Development Company, may be used.

The carboxyl-terminated butadiene polymers may be prepared as described in U.S. Pat. 3,235,589, and may have a molecular weight within the range 500 to 10,000. Alternatively, a commercially available carboxyl-terminated butadiene liquid polymer, as for example, those designated Hystl® C–1000 and C–2000 from the Hystl Development Company, and those designated HC–434 from Thiokol Chemical Corporation, may be used.

The phenyl-terminated butadiene polymers may be any commercially available liquid polymer, as for example, Lithene AL, Lithene AM, Lithene AH, Lithene PL, Lithene PM, and Lithene PH, all from Lithium Corporation of America.

The copolymers of butadiene may be with styrene, acrylic acid, vinyl acetate, acrylonitrile, isoprene, α-methyl styrene, N-vinyl carbazole, N-vinyl pyrollidene, methacrylic acid, acrylamide, methyl methacrylate, butyl methacrylate, vinyl chloride, or any other monomer. Examples of commercially available copolymers are designated Poly BD® CS–15 and CN–15 from Atlantic Richfield Company, both of which contain hydroxyl terminals. CS–15 is a 75/25 butadiene/styrene polymer. CN-15 is an 85/15 butadiene/acrylonitrile polymer.

these variations with the fluorine contents of the resultant modified resins is contained in Table I.

TABLE I.—SUMMARY OF EXAMPLES II–XIV

| Ex. No. | Butadiene resin | Terminals of resin | Carbon content of $R_fI$ | Solvent | Temperature, °C | Catalyst | Percent F in product |
|---|---|---|---|---|---|---|---|
| II | Poly BD R-45M | —OH | $C_{12-20}$ | Dioxane | 110 | Benzoyl peroxide | 11.12 |
| III | Poly BD R-45M | —OH | $C_{2-20}$ | Acetone | 60 | ___do___ | 7.43 |
| IV | Poly BD R-45M | —OH | $C_{2-20}$ | Dioxane | 90 | ___do___ | 8.06 |
| V | Poly BD R-45M | —OH | $C_{2-20}$ | ___do___ | 70 | ___do___ | 13.91 |
| VI | Hystl G-1000 | —OH | $C_{2-20}$ | ___do___ | 70 | ___do___ | 17.52 |
| VII | Hystl G-1000 | —OH | $C_{10}$ | ___do___ | 90 | ___do___ | 21.55 |
| VIII | Poly BD CN-15 | —OH | $C_{2-20}$ | ___do___ | 105 | ___do___ | 6.04 |
| IX | Lithene PL | Phenyl | $C_{2-20}$ | ___do___ | 115 | ___do___ | 12.26 |
| X | Lithene AL | ___do___ | $C_{2-20}$ | ___do___ | 106 | ___do___ | 9.37 |
| XI | Lithene PL | ___do___ | $C_{2-20}$ | ___do___ | 63 | ___do___ | 12.23 |
| XII | Poly BD R-45M | —OH | $C_{2-20}$ | None | 70 | ___do___ | 9.38 |
| XIII | HC-434 | —COOH | $C_8$ | Toluene | Reflux | ___do___ | 7.03 |
| XIV | Poly BD CS-15 | —OH | $C_{6-10}$ | Acetone | 55 | Azobisisobutyronitrile | 5.68 |

The present reaction may be carried out in either a batch or continuous manner. While, for small scale preparations, the batch reaction is more convenient, the continuous reaction is more useful for commercial operations. The reaction is carried out at either atmospheric or super atmospheric pressure depending on the reactants.

The reaction temperature varies considerably depending on the nature of the free-radical generating catalyst being used. Azo catalysts such as azobisisobutyronitrile require relative low temperatures such as 50 to 80° C. Benzoyl peroxide requires a somewhat higher temperature such as 70 to 100° C., while a dialkyl peroxide such as di-tert-butyl peroxide requires an even more elevated temperature such as 100 to 130° C. However, ultraviolet light which will also initiate the reaction does not require any specific reaction temperature and may proceed at any temperature. Generally, a lower reaction temperature will result in a product with a higher fluorine content, which has better oil-soil repellancy properties.

The reaction may be carried out in either a solvent or non-solvent system. The only requirement for the selection of the solvent, if one is used, is that it be compatible with the catalyst; i.e., the solvent must not be attacked by the free radical generating catalyst. The time of reaction may vary from 2 to 20 hours or more depending upon the other conditions.

The reaction products of this invention may be dehydroiodinated by reaction with a strong base such as sodium hydroxide or potassium hydroxide in a suitable medium such as water or dioxane. The removal of the iodine produces a less corrosive product.

The dehydroiodinated product is encompassed within the meaning of the reaction product of the perfluoroalkyl iodides and the butadiene polymers and copolymers.

The following representative examples are given to illustrate the practice of the present invention and are not intended to limit the scope of the invention.

EXAMPLE I

A mixture of 250 g. of Poly BD R-45M resin (hydroxyl-terminated polybutadiene polymer), 61.24 g. of perfluorodecyl iodide ($C_{10}F_{21}I$), 5 g. benzoyl peroxide (2% based on the weight of the resin), and 200 mls. of dioxane was placed in a reaction flask which contained a stirrer and a condenser. The cloudy pink mixture turned clear amber during gradual heating to 90° C. The reaction was kept at a slow reflux for 10 hours and the progress thereof followed by vapor phase chromatographic analysis. When no unreacted $C_{10}F_{21}I$ was present, as shown by the chromatographic analysis, the solvent was removed by means of a vacuum evaporator with a water bath at 40° C. for 7 hours. The result was 237.1 g. of product which analyzed at 11.0% of fluorine.

EXAMPLES II–XIV

The procedure of Example I was repeated varying the type of butadiene resins, the perfluoroalkyl iodides, the solvent, the temperature, and the catalyst. A summary of

EXAMPLE XV

The reaction of the perfluoroalkyl iodides with the butadiene resins is performed under ultraviolet initiation as follows:

Poly BD R-45M and perfluoroalkyl iodides, wherein the alkyl group of the iodides is a mixture of $C_{12-16}$, is placed in a 500 ml. quartz flask which is fitted with an agitator. A positive nitrogen pressure is maintained and the mixture is stirred while the flask is irradiated with ultraviolet light from a 140 watt Hanovia Alpine Lamp (Type 30620) which is placed one inch from the outer wall of the flask. The ultraviolet exposure is continued for 20 hours, whereupon the flask is fitted with a condenser and is heated to 100° C. at 10 mm. pressure to remove the unreacted perfluoroalkyl iodides. The dark yellow residual oil is the fluorinated product which would contain 5.38% fluorine.

What is claimed is:

1. A perfluoroalkyl iodide modified functionally-terminated butadiene polymer prepared from the reaction of perfluoroalkyl iodide and a functionally-terminated polymer containing pendent vinyl groups wherein at least some of said pendent groups are reacted with said perfluoroalkyl iodide in a solvent under refluxing conditions at a temperature of from 50 to about 130° C. and in the presence of a catalyst.

2. The polymer of Claim 1 wherein the perfluoroalkyl iodide contains 2 to 20 carbon atoms.

3. The polymer of Claim 1 wherein the functional terminals are selected from the group consisting of hydroxyl, carboxyl, and phenyl.

4. The polymer of Claim 3 wherein the functional terminals are hydroxyl.

5. The polymer of Claim 1 wherein it is dehydroiodinated.

6. The polymer of Claim 1 wherein the solvent is selected from the group consisting of dioxane, acetone and toluene.

7. The polymer of Claim 1 wherein the catalyst is selected from the group consisting of benzoyl peroxide, dialkyl peroxide and azobisisobutyronitrile.

8. The polymer of Claim 1 wherein the catalyst is ultraviolet radiation.

9. A perfluoroalkyl iodide modified functionally-terminated butadiene copolymer prepared from the reaction, in a solvent of perfluoroalkyl iodide and a functionally-terminated butadiene copolymer which contains pendent vinyl groups wherein at least some of said pendent groups are reacted with said perfluoroalkyl iodide under refluxing conditions at a temperature of from 50° to about 130° C. and in the presence of a catalyst.

10. The copolymer of Claim 9 wherein the copolymer is of butadiene and a second monomer selected from a group consisting of styrene, acrylonitrile, acrylic acid and vinyl acetate.

11. The copolymer of Claim 9 wherein the second monomer is styrene.

12. The copolymer of Claim 9 wherein the second monomer is acrylonitrile.

13. The copolymer of Claim 9 wherein the perfluoroalkyl iodide contains 2 to 20 carbon atoms.

14. The copolymer of Claim 9 wherein the functional terminals are selected from the group consisting of hydroxyl, carboxyl, and phenyl.

15. The copolymer of Claim 14 wherein the functional terminals are hydroxyl.

16. The copolymer of Claim 9 wherein it is dehydroiodinated.

17. The copolymer of Claim 9 wherein the solvent is selected from the group consisting of dioxane, acetone and toluene.

18. The copolymer of Claim 9 wherein the catalyst is selected from the group consisting of benzoyl peroxide, dialkyl peroxide and azobisisobutyronitrile.

19. The polymer of Claim 9 wherein the catalyst is ultraviolet light.

References Cited

UNITED STATES PATENTS

| | | | |
|---|---|---|---|
| 3,135,716 | 6/1964 | Uvaneck et al. | 260—94.7 R X |
| 3,145,222 | 8/1964 | Brace | 260—89.7 X |

FOREIGN PATENTS

| | | | |
|---|---|---|---|
| 16,796 | 1965 | Japan | 260—94.7 |

HARRY WONG, Jr., Primary Examiner

W. F. HAMROCK, Assistant Examiner

U.S. Cl. X.R.

204—159.18; 260—83.3, 83.5, 85.1, 94.7 HA, 96 HAL